(12) United States Patent
Riman

(10) Patent No.: US 10,772,296 B2
(45) Date of Patent: Sep. 15, 2020

(54) GROOMING TOOL

(71) Applicant: Jeffrey Michael Riman, Plantation, FL (US)

(72) Inventor: Jeffrey Michael Riman, Plantation, FL (US)

(*) Notice: Subject to any disclaimer, the term of this patent is extended or adjusted under 35 U.S.C. 154(b) by 410 days.

(21) Appl. No.: 15/588,200

(22) Filed: May 5, 2017

(65) Prior Publication Data

US 2017/0318784 A1 Nov. 9, 2017

Related U.S. Application Data

(60) Provisional application No. 62/333,001, filed on May 6, 2016.

(51) Int. Cl.
*A01K 13/00* (2006.01)

(52) U.S. Cl.
CPC .................................. *A01K 13/002* (2013.01)

(58) Field of Classification Search
CPC ... A01K 13/001; A01K 13/002; A01K 13/003
USPC ......... 30/32, 34.05, 34.1, 34.2, 38, 40, 40.1, 30/40.2, 41.9, 43.1, 43.2, 43.3, 50, 53, 30/210; 119/601, 608, 609, 610, 611, 119/612, 613, 614, 615, 616, 617
See application file for complete search history.

(56) References Cited

U.S. PATENT DOCUMENTS

| | | | | |
|---|---|---|---|---|
| 309,668 | A * | 12/1884 | Weightman | A01K 13/002 119/613 |
| 2,288,299 | A * | 6/1942 | Pileggi | B26B 21/125 132/148 |
| 2,883,747 | A * | 4/1959 | Johnson | B26B 19/42 30/210 |
| 3,019,463 | A * | 2/1962 | Mitchell | A46B 13/02 132/119.1 |
| 3,136,055 | A * | 6/1964 | Kobler | B26B 19/046 30/34.2 |
| 3,160,142 | A * | 12/1964 | Torow | A01K 13/002 119/623 |
| 3,183,591 | A * | 5/1965 | Dumont | B26B 19/42 15/23 |
| 3,384,096 | A * | 5/1968 | Paccione | A45D 24/007 132/119.1 |
| 3,427,674 | A * | 2/1969 | Simon, Jr. | A46B 13/02 15/23 |
| D666,374 | S * | 8/2012 | Angel | D32/41 |
| 8,479,749 | B2 * | 7/2013 | Randolph | A45D 24/14 132/120 |
| 2005/0011076 | A1 * | 1/2005 | Andis | B26B 19/06 30/223 |
| 2011/0180013 | A1 * | 7/2011 | Kissel, Jr. | A01K 13/002 119/609 |

* cited by examiner

*Primary Examiner* — Ebony E Evans

(57) ABSTRACT

A new elongated grooming tool with an elongated outer surface having protrusions located at one end and several blades attached to the second end is provided. The invention includes a version having retractable blades and a sliding actuator for activating and deactivating the blades.

8 Claims, 9 Drawing Sheets

GROOMING TOOL

BACKGROUND OF THE INVENTION

1. Field of the Invention

The present invention relates to a grooming tool for animals with hair or fur, specifically to a device for removing loose hair or fur.

2. Description of the Related Art

Throughout this patent application, the term "fur" shall mean "hair" and/or "fur". The problem of shedding and loose fur is long known. For a grooming tool to be effective, it must remove matted, loose and/or disconnected fur from the animal and fur that is still loosely connected to the animal's skin.

Animals such as dogs and cats have coats that tend to molt or shed fur. A tool that can remove detached or almost detached fur, while leaving live, secure fur in place, is preferred to a brush, which is often ineffective and may be painful to the animal.

Many pet owners and pet groomers employ combs, brushes and sticky devices similar to tools for removing lint from clothing. Some prior art inventions pass a toothed blade through a pet's fur coat to remove the detached hairs. Some have mounted a serrated blade to a handle, like the Furminator Pet Grooming Tool (disclosed in U.S. Pat. No. 7,509,926 and incorporated herein by reference), for perceived better gripping and handling of the toothed blade. Other prior art inventions include an array of protrusions which can gather loose fur from the animal.

However, the disclosed prior art inventions are unwieldy, ineffective and inefficient. Furthermore, the prior art inventions are bulky and difficult to control. In addition, the fur removal from the prior art having a blade requires a user to remove fur from the blade with the user's fingers, which may be dangerous to a user or animal if the user is not very careful or if an animal moves suddenly during the removal process.

Thus, it can be seen that there remains a need for a grooming tool which is easier to handle, more effective and more efficient than existing grooming tools.

SUMMARY OF THE INVENTION

Generally speaking, the present invention relates to a new elongated, cylindrical grooming tool with an elongated outer surface having protrusions located at one end and blades attached to the second end is provided. One embodiment of the invention includes a version having retractable blades and a sliding actuator. The tool is compact and easy to control because the body of the tool itself is used for the handle for the user and because multiple blades may be used simultaneously. The use of multiple blades in the same tool make this invention highly efficient. In addition, the ability to retract the blades makes fur removal both safe and effective.

Accordingly, it is an object of the invention to provide a grooming tool for pets, such as dogs and cats, which overcomes drawbacks of the prior art.

Another object of the invention is to provide a compact and efficient grooming tool.

Still other objects and advantages of the invention will in part be obvious and will in part be apparent from the specification and drawings.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated are examples. It is understood that the invention is not limited to the precise arrangements and instrumentalities shown, wherein.

DETAILED DESCRIPTION OF THE INVENTION

Figure 1:
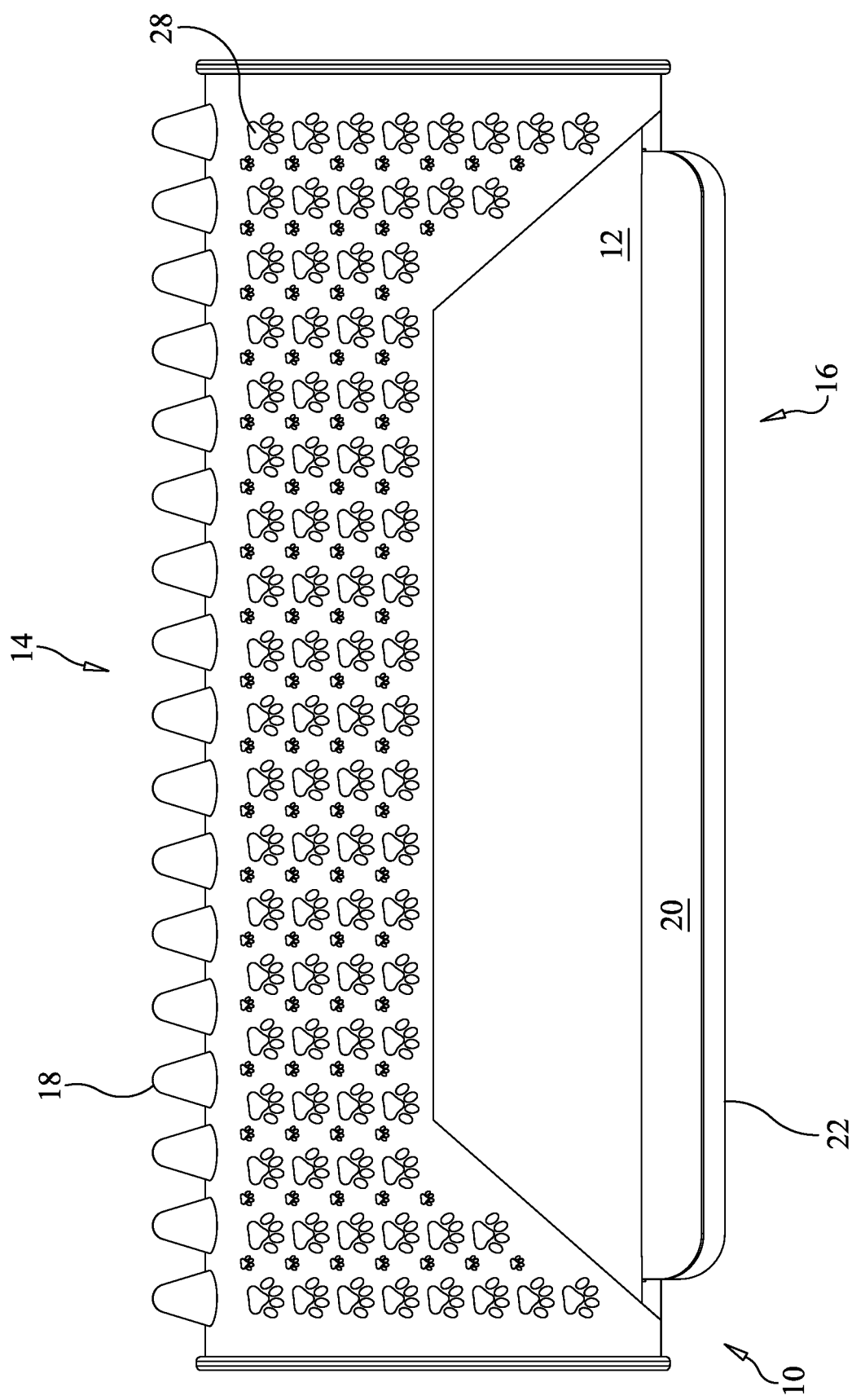
FIG. 1 is a top view of an embodiment of the invention.
Figure 2:
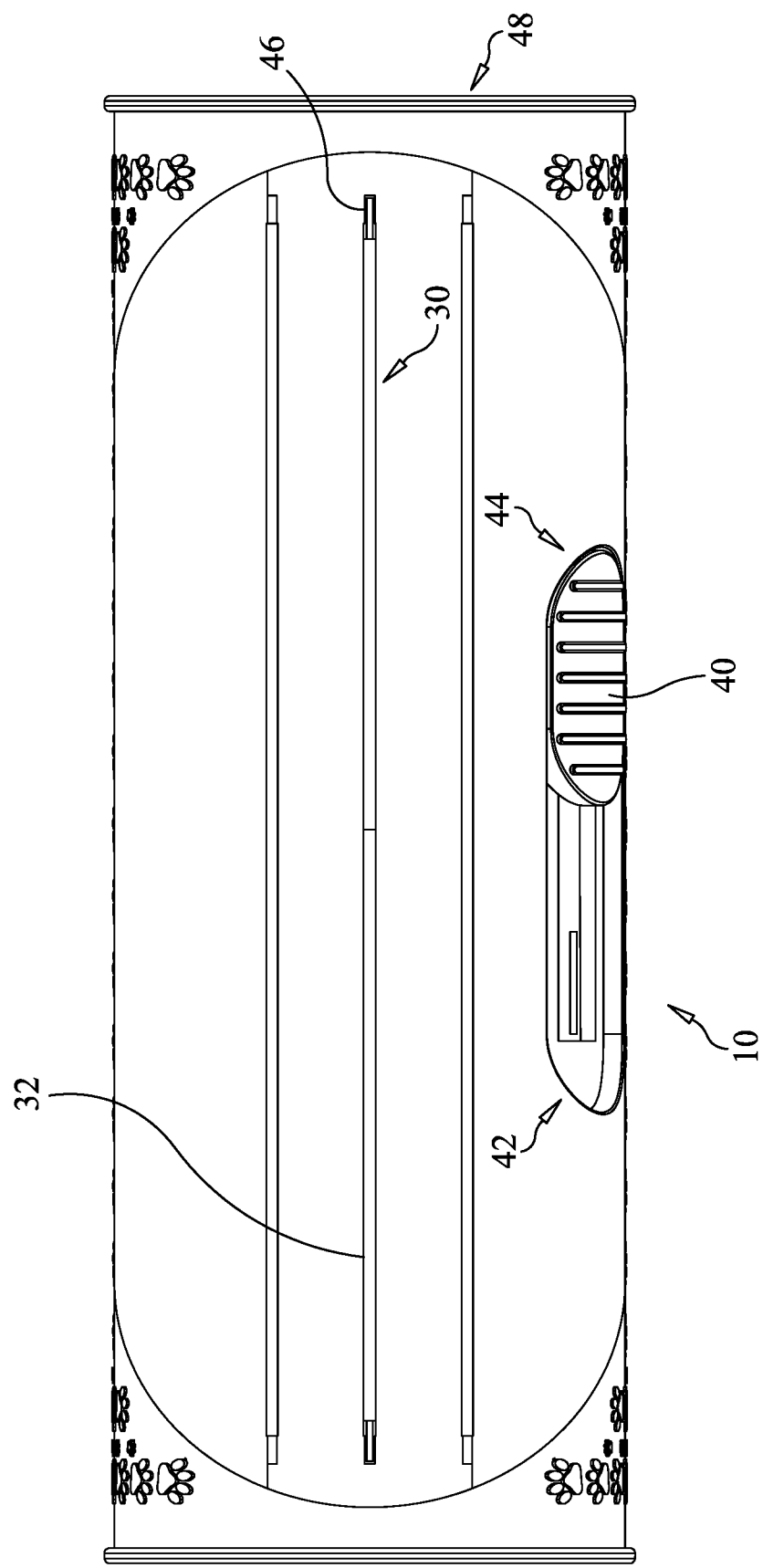
FIG. 2 is a side view of another embodiment of the invention.

An improved grooming tool constructed in accordance with preferred embodiments of the invention is shown generally as a grooming tool 10 in FIGS. 1-7. Grooming tool 10 includes an elongated outer surface 12 having a first end 14 and a second end 16 generally opposite the first end 14.

A plurality of protrusions 18 is located at the first end 14. At the second end 16 are one or more blades 20 having blade edges 22. The blades 20 have a predetermined height. The blade edges 22 may be toothed or serrated, or have a specialized edge geometry or toothedness which is adapted specifically for the removal of fur. For example, a hacksaw blade edge shape may be used. The blades 20 extend along the length of the outer surface 12 of the grooming tool 10.

The outer surface 12 of the grooming tool 10 may also be ergonomically contoured for a user's hand. The outer surface may be generally cylindrical, oval, ergonomically advantageous or any other similar general shape.

The blades 20 may be fixed to the outer surface 12 of the grooming tool 10, or they may be removable from the outer surface 12 of the grooming tool 10. They may be removable as a single attachment element for multiple blades, or individual or multiple blades may be separately detachable. As described below, the blades 20 may also emerge outwardly from outer surface 12 of the grooming tool 10.

Figure 4:
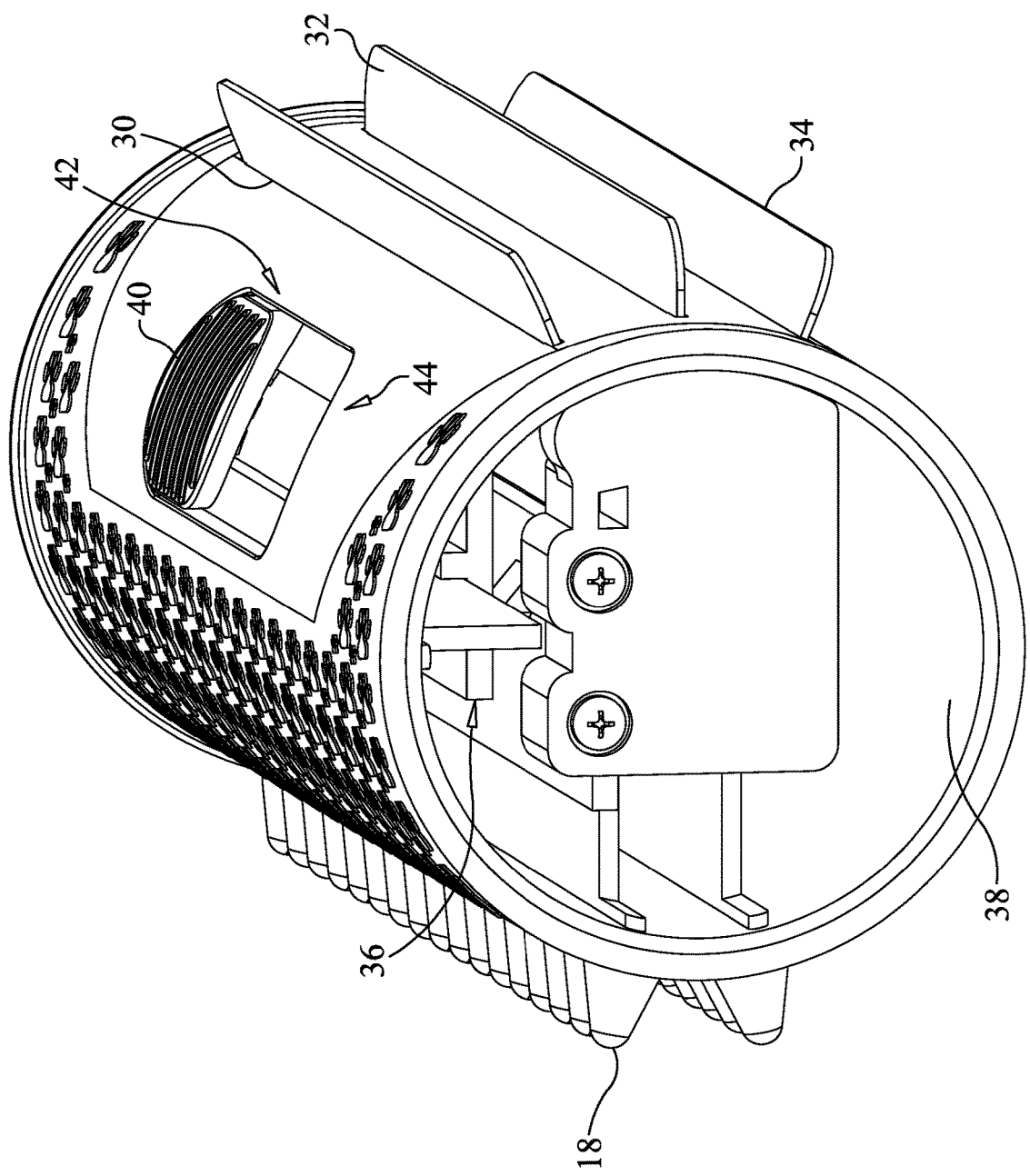
FIG. 4 is a perspective schematic end view of an embodiment of the invention revealing the interior surface of the invention.
Figure 5:
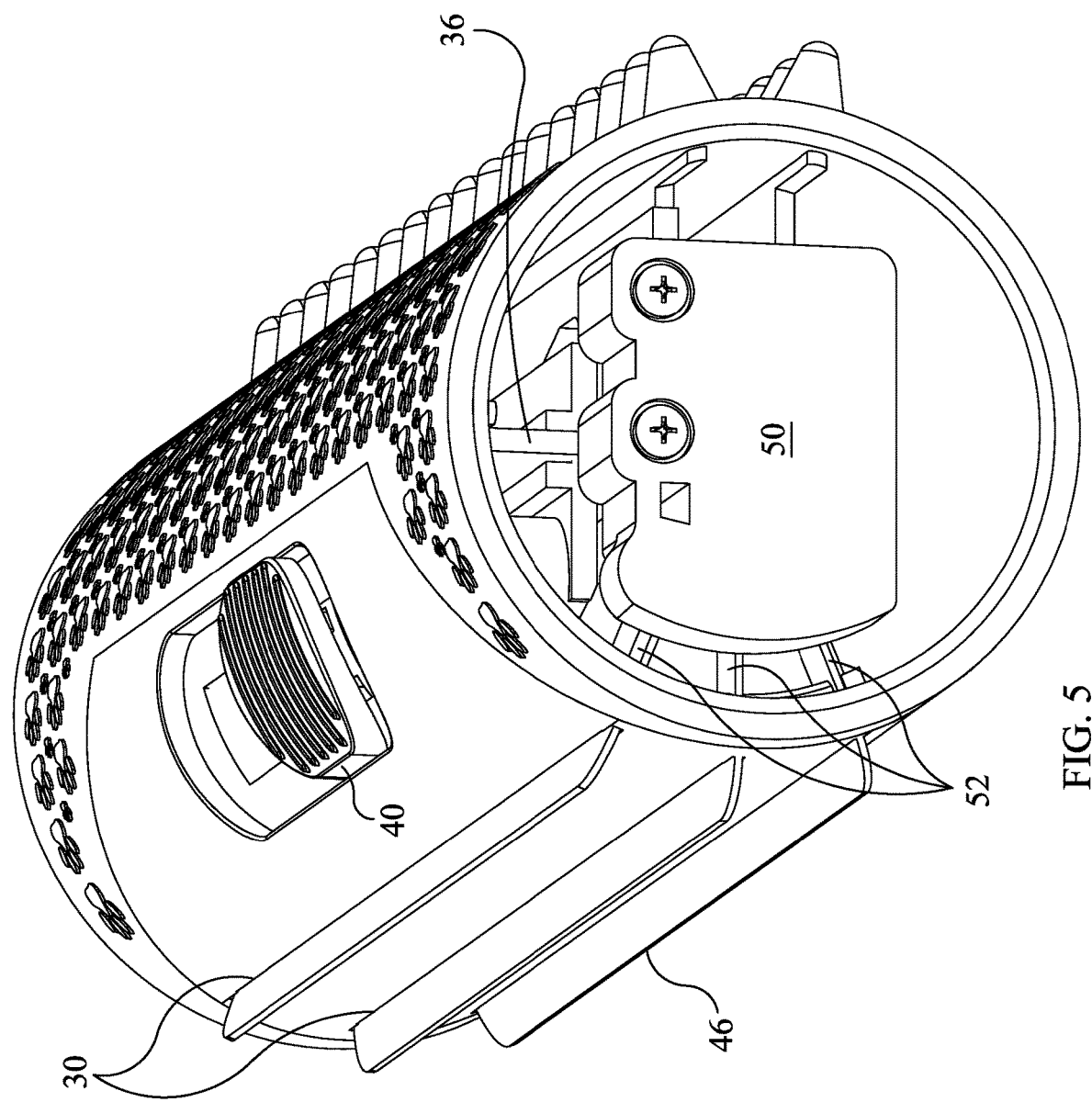
FIG. 5 is a perspective schematic end view of an embodiment of the invention revealing the interior surface of the invention with the blades in a fully partially setting.
Figure 6:
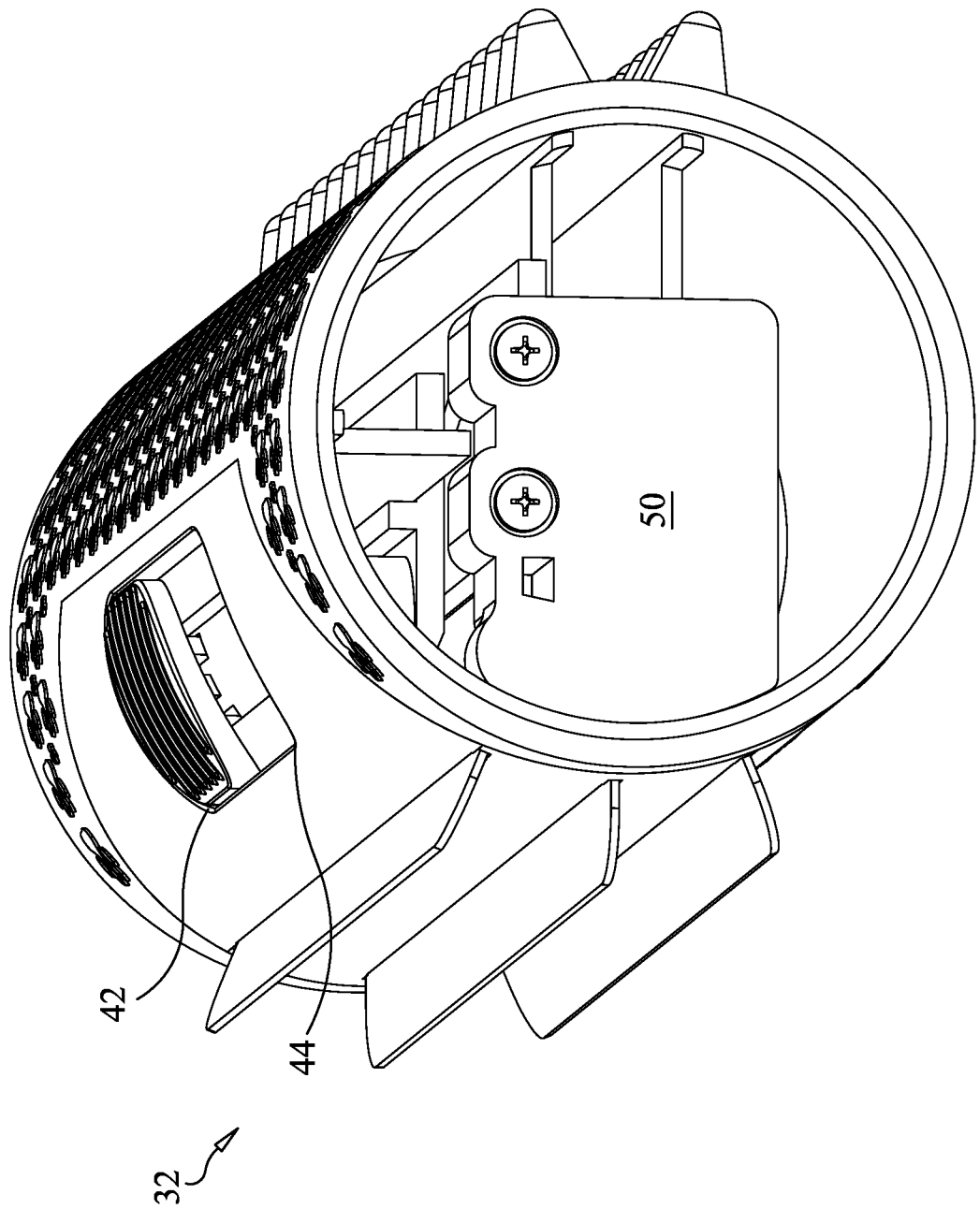
FIG. 6 is a perspective schematic end view of an embodiment of the invention with the blades in a fully activated setting.
Figure 7:
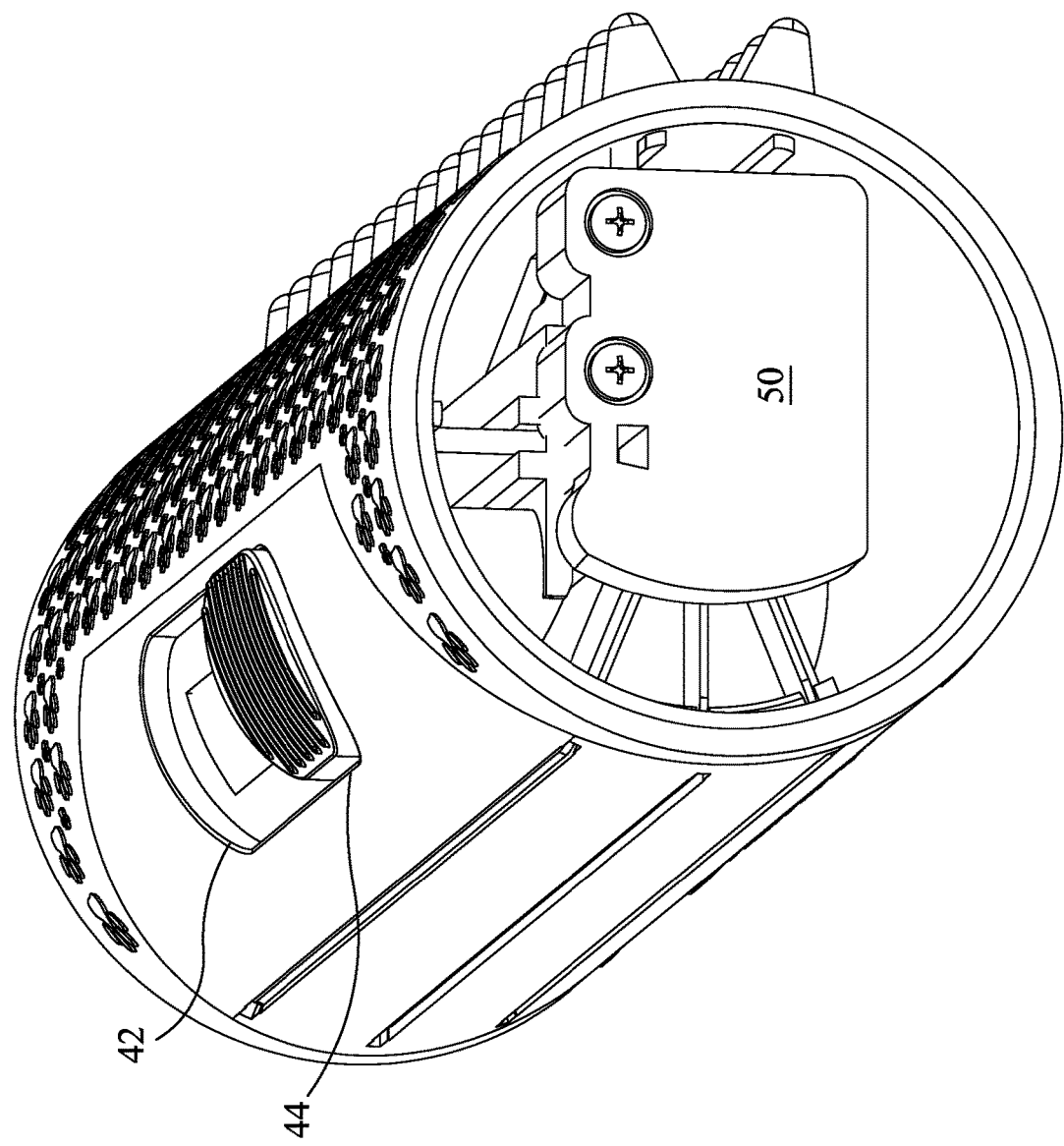
FIG. 7 is a perspective schematic end view of an embodiment of the invention with the blades in a deactivated setting.

As shown in FIG. 1, the protrusions 18 may be conical, pyramidal, or cylindrical in shape or have other known geometry. The protrusions 18 may form a line or be formed into an array. One array of rows is shown in FIG. 4, but other arrays known in the art are contemplated. There may be one, two three or more rows in the array, and the protrusions may be aligned in any type of pattern. For example, the array may spell a word or form an image. A protrusion 18 may have a blunted point, as shown or a sharp point. In the array, the protrusions may be approximately ⅛ to ½ inch in height. In addition, the distance between the protrusions may be approximately ⅛ to ½ inch in distance. The protrusion height may be approximately the same as the blade height.

Figure 3:
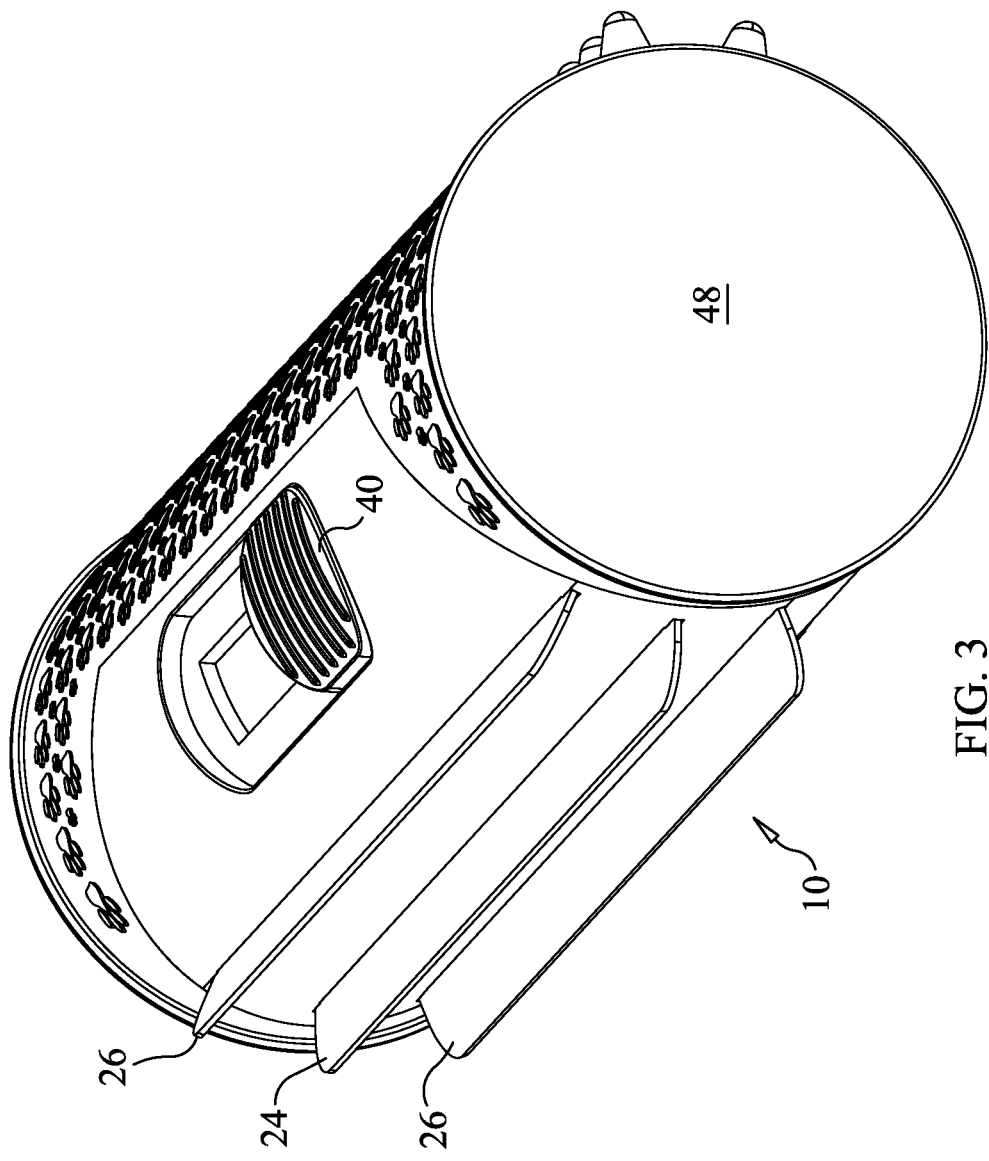
FIG. 3 is an end perspective view of an embodiment of the invention.

The grooming tool 10 may have one blade 20. The grooming tool may alternatively have multiple blades 20, such as the three blades shown in FIG. 3. As shown in FIG. 3, the grooming tool 10 may also have one or more central blades 24 and one or more outer blades 26. The outer blades 26 may be angled away from a central blade 24.

In addition, the grooming tool 10 may have texture elements 28 on at least portions of its outer surface 12. The texture elements 28 may be of any shape, such as the paws shown in the figures.

In another embodiment, shown in FIGS. 2-7, the outer surface 12 of the grooming tool 10 has one or more blade slits 30 located at the second end 16. One or more retractable blades 32, having blade edges 34 such as those described above, may be connected to an adjustment mechanism 36 located in an interior region of the grooming tool 10. The adjustment mechanism 36 manipulates the inward and outward direction of the blades 32 relative to the blade slits 30 upon the activation of an actuator 40. As shown, the adjustment mechanism 36 may be attached to the inner surface 38 of the grooming tool 10.

The outer surface includes an actuator 40 in mechanical connection with the adjustment mechanism 36. The actuator 40 as shown in FIGS. 2-7 is a sliding mechanism, but other actuator mechanisms are known in the art, including electronic actuator mechanisms. The actuator 40 has a blade activation setting 42 for extending the blade and a blade deactivation setting 44 for retracting the blade. The actuator 40 may also have intermediate settings so that the blade edges 34 may be set to intermediate heights relative to the outer surface 12 of the grooming tool 10.

In another embodiment, the actuator 40 may comprise one or more sliding mechanisms located on one or more end surface 48 of the grooming tool 10.

The retractable blades 32 are located near the blade slits 30 and are movable perpendicular to the outer surface 12 of the grooming tool 10 through the blade slits 30 so that the blade edges 34 may extend beyond the outer surface 12 of the grooming tool 10 upon activation.

The blade edges 34 may extend through the blade slits 30 to the outer surface 12 of the grooming tool brush 10 when the actuator 40 is at the blade activation setting 42. The blade edges 34 may be set to lie below rims 46 of the slits 20 when the blade is retracted.

In another embodiment of the invention, the blades 32 are connected to an adjustment mechanism 36 which in turn is connected to the inner surface 38 of the grooming tool 10. The adjustment mechanism 36 is connected to one or more actuators 40 located on the outer surface 12 of the grooming tool 10. In this configuration the blades 32 are movable in height relative to the outer surface 12 of the grooming tool upon activation of the actuator 40.

Figure 8:
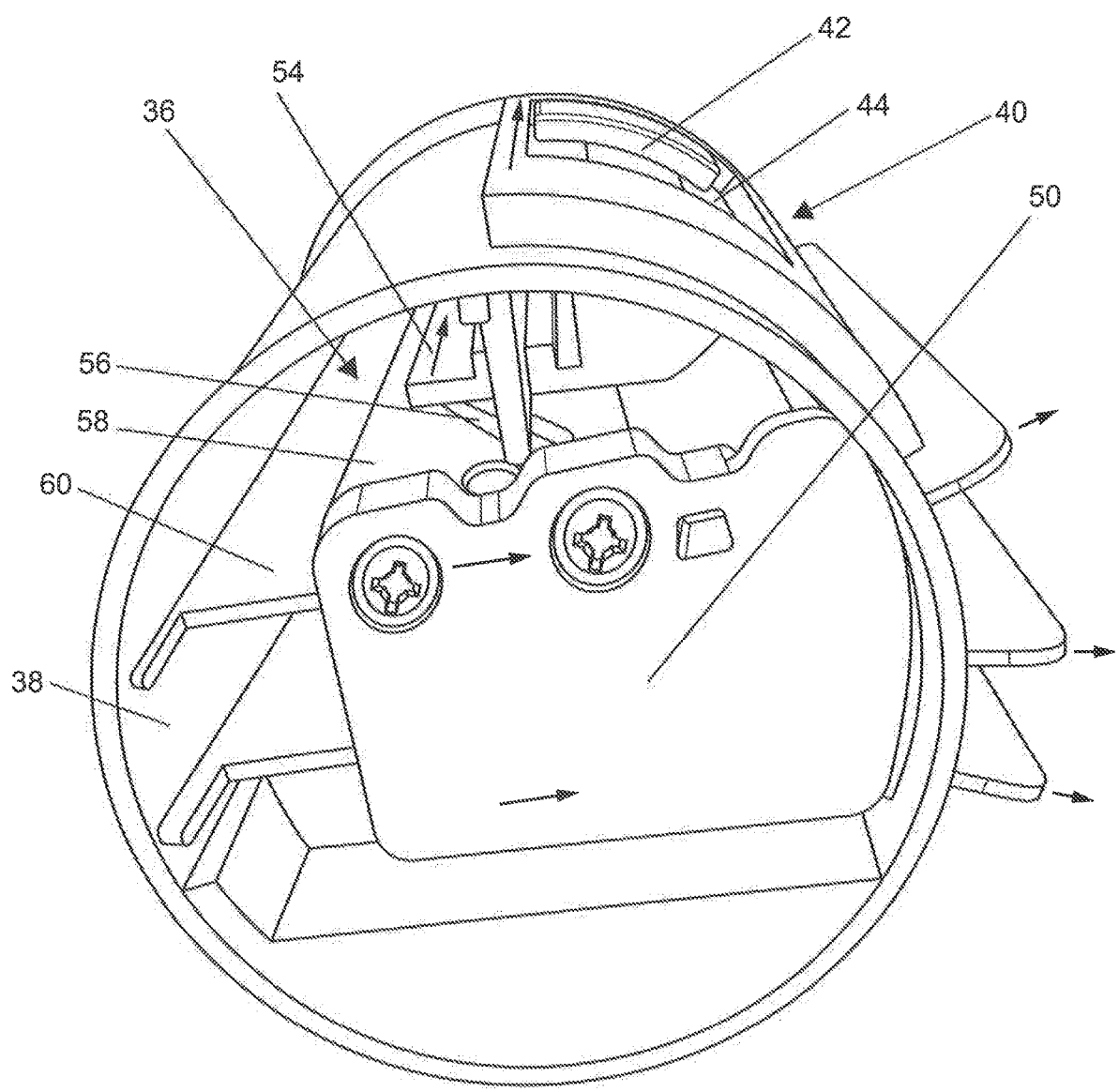
FIG. 8 is another perspective schematic end view of an embodiment of the invention with the blades in a fully activated setting.
Figure 9:
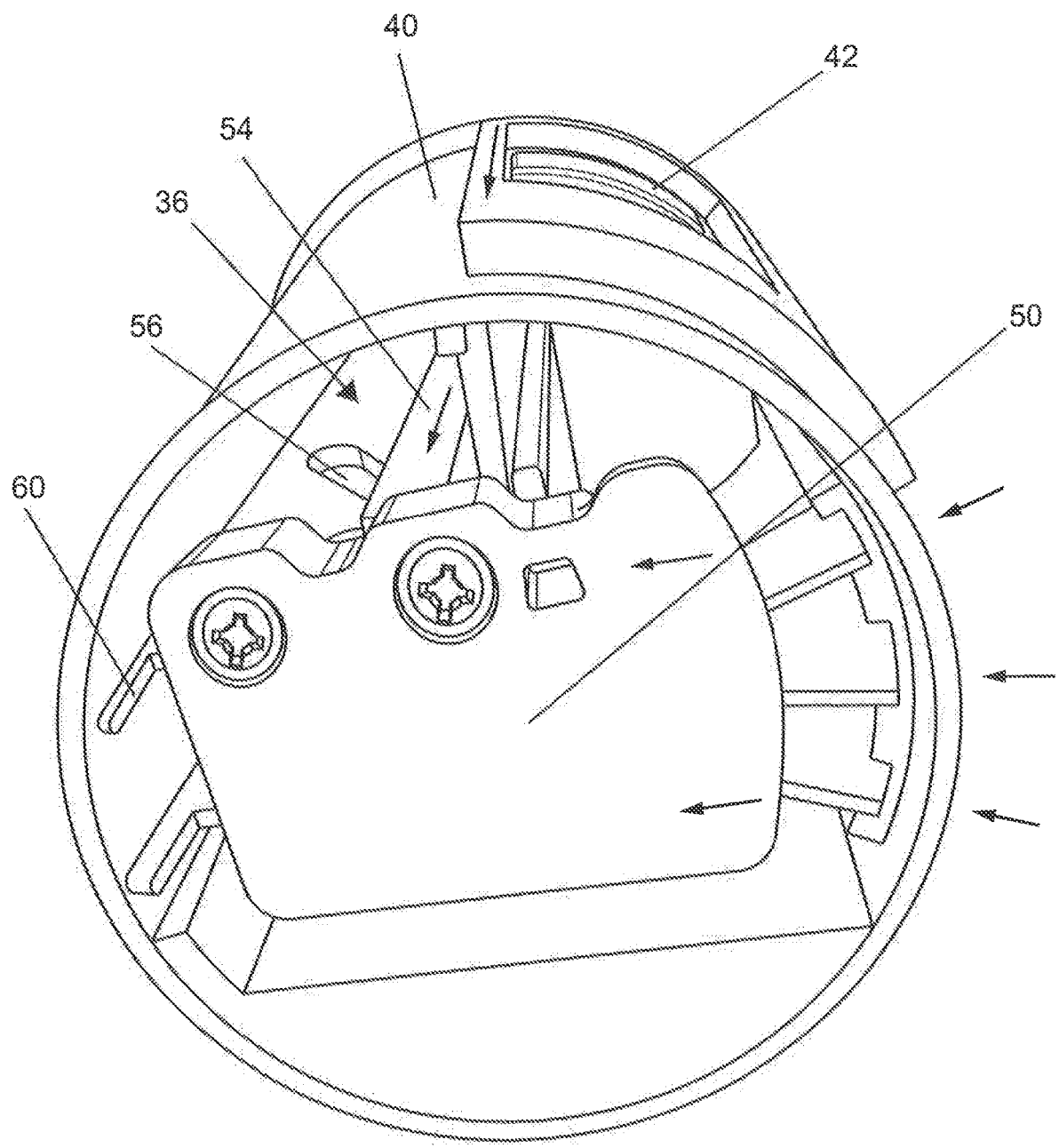
FIG. 9 is another perspective schematic end view of an embodiment of the invention with the blades in deactivated setting.

As shown in FIGS. 6 through 9, the grooming tool 10 may include at least one blade plate 50 located on the inner surface 38 of the grooming tool in fixed connection with one or more bases 52 of blades 32. The blade plate 50 may be in movable connection with the adjustment mechanism 36 which is in movable connection with the actuator 40. As illustrated in FIGS. 8 and 9, the adjustment mechanism 36 may include a bar 54 attached to the actuator 40 which fits slidably into a grooved portion 56 of a longitudinal section 58 of the base plate 50. The longitudinal section 58 in turn slides along a brace 60 located at the inner surface 38 of the grooming tool. Thus, when the adjustment mechanism 36 is activated by the actuator 40, the blade plate 50 is moved and adjusts the height of the blades.

In another embodiment, the grooming tool has an elongated generally cylindrical outer surface with a first end, and a second end opposite the first end. The grooming tool also has an inner surface. There are a plurality of protrusions located on the outer surface at the first end, and one or more blade slits extending through the outer surface located at the second end. One or more blades having blade edges are connected to an adjustment mechanism located on the grooming tool. The adjustment mechanism may be on the interior or exterior surface of the grooming tool. An actuator is mechanically connected with the adjustment mechanism. The actuator has a blade activation setting and a blade deactivation setting. The blades are located near the blade slits. The blades are movable perpendicular to the outer surface of the grooming tool through the blade slits. The blades edges extend through the blade slits when the actuator is at the blade activation setting. Outer blades may extend outwardly from one or more central blades. The blade edges may be set to lie below a rim of the blade slits when the actuator is at the blade deactivation setting. The actuator includes a sliding mechanism located on the outer surface of the grooming tool, and the blades are in mechanical connection with an adjustment mechanism connected to an inner surface of the grooming tool. The blades are movable in height relative to the outer surface of the grooming tool upon activation of the sliding mechanism. The adjustment mechanism comprises at least one blade plate located on the inner surface of the grooming tool in fixed connection with a base of one or more blades and in movable connection with the sliding mechanism.

The invention is used as follows. The user moves the actuator on the grooming tool to move the blades to a predetermined height. The user then holds the elongated surface of the grooming tool. The user moves the blades from the grooming tool on an animal and remove fur from an animal. Fur may then be stuck to or in the blades. The user then moves the actuator on the grooming tool to the blade deactivation setting, lowering the blades so that they lie at or below the surface of the grooming tool. The user then wipes or blows the removed fur from the grooming tool. With the blades in the blade deactivation setting, the user may quickly and efficiently use the protrusions on the grooming tool on the animal to soothe the animal and remove additional fur. The user may alternatively use the protrusions before using the blades on the animal. The user may alternate sides of the grooming tool against the fur. Thus a user may use both the protrusion surface and the blades of the invention while holding it in one hand, so that the user may use the other hand to control the animal, if necessary.

The user may use the grooming tool by moving the grooming tool through the animal's fur in the direction in which the fur grows.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween. A variety of modifications and variations are possible in light of the above teachings without departing from the scope and spirit of the invention.

What is claimed is:
1. A grooming tool, comprising:
  a. an elongated outer surface having
    i. a long axis extending in the direction of elongation of the elongated outer surface,
    ii. a first end on a first side of the long axis, and
    iii. a second end opposite the first end on a second side of the long axis opposite to the first side,
  b. an inner surface,
  c. a plurality of protrusions located on the outer surface at the first end forming a handle, and
  d. one or more blade slits located at the second end extending through the outer surface,
  further comprising:
  e. one or more blades having blade edges connected to an adjustment mechanism located on the grooming tool, and
  f. an actuator located between the plurality of protrusions and the one or more blades slits, in mechanical connection with the adjustment mechanism, having a blade activation setting and a blade deactivation setting,
  g. wherein the one or more blades are movable generally perpendicular to the outer surface of the grooming tool through one or more blade slits.
  h. wherein the blade edges extend above a rim of the one or more blade slits when the actuator is at the blade activation setting, and
  i. wherein the blade edges lie below the rim of the one or more blade slits when the actuator is at the blade deactivation setting.
2. The grooming tool of claim 1, wherein the actuator comprises a sliding mechanism located on the outer surface of the grooming tool.
3. The grooming tool of claim 2, further comprising:
  a. a first end surface, and
  b. a second end surface,
  c. wherein the actuator is located on at least one of the first end surface and the second end surface.
4. The grooming tool of claim 1,
  wherein the one or more blades are connected to the adjustment mechanism,
  wherein the adjustment mechanism is connected to an inner surface of the grooming tool,
  wherein the adjustment mechanism is connected to the actuator,
  wherein the one or more actuators are located on the outer surface of the grooming tool, and
  wherein the one or more blades are movable in height with relation to the outer surface of the grooming tool upon activation of the actuator.
5. The grooming tool of claim 4, further comprising at least one blade plate located on the inner surface of the grooming tool in fixed connection with a base of a blade and in movable connection with a sliding mechanism.
6. A grooming tool, comprising:
  a. an elongated generally cylindrical outer surface having
    i. first end, and
    ii. a second end opposite the first end,
  b. an inner surface,
  c. a plurality of protrusions located on the outer surface at the first end,
  d. one or more blade slits extending through the outer surface located at the second end,
  e. one or more blades having blade edges connected to an adjustment mechanism located on the grooming tool,
  f. an actuator in mechanical connection with the adjustment mechanism having a blade activation setting and a blade deactivation setting,
  wherein the one or more blades are movable perpendicular to the outer surface of the grooming tool through the one or more blade slits,
  wherein the blades edges extend through the blade slits to the outer surface of the grooming tool when the actuator is at the blade activation setting,
  wherein the blade edges lie below a rim of the blade slits when the actuator is at the blade deactivation setting,
  wherein the actuator comprises a sliding mechanism located on the outer surface of the grooming tool,
  wherein the blades are in mechanical connection with the adjustment mechanism connected to an inner surface of the grooming tool,
  wherein the blades are movable in height relative to the outer surface of the grooming tool upon activation of the sliding mechanism, and
  wherein the adjustment mechanism comprises at least one blade plate located on the inner surface of the grooming tool in fixed connection with a base of a blade and in movable connection with the sliding mechanism.
7. A grooming tool, comprising:
  a. an elongated outer surface having
    i. a first end, and
    ii. a second end opposite the first end,
  b. an inner surface,
  c. a plurality of protrusions located on the outer surface at the first end,
  d. one or more blade slits located at the second end extending through the outer surface,
  e. one or more blades having blade edges connected to an adjustment mechanism located on the grooming tool, and
  f. an actuator, in mechanical connection with the adjustment mechanism, having a blade activation setting and a blade deactivation setting,
  g. wherein the one or more blades are movable generally perpendicular to the outer surface of the grooming tool through the one or more blade slits,
  h. wherein the blade edges extend above a rim of the one or more blade slits when the actuator is at the blade activation setting, and
  i. wherein the blade edges lie below the rim of the one or more blade slits when the actuator is at the blade deactivation setting.
8. A grooming tool, comprising:
  a. an elongated outer surface having
    i. a long axis extending in the direction of elongation of the elongated outer surface,
    ii. a first end on a first side of the long axis, and
    iii. a second end opposite the first end on a second side of the long axis opposite to the first side,
  b. an inner surface,
  c. a plurality of protrusions located on the outer surface at the first end forming a handle, and
  one or more blade slits located at the second end extending through the outer surface, further comprising:

d. one or more blades having blade edges connected to an adjustment mechanism located on the grooming tool, and e. an actuator located between the plurality of protrusions and the one or more blades slits, in mechanical connection with the adjustment mechanism, having a blade activation setting and a blade deactivation setting, wherein the one or more blades are movable generally perpendicular to the outer surface of the grooming tool through one or more blade slits, wherein the one or more blades are connected to the adjustment mechanism, wherein the adjustment mechanism is connected to an inner surface of the grooming tool, wherein the adjustment mechanism is connected to the actuator, wherein the one or more actuators are located on the outer surface of the grooming tool, and wherein the one or more blades are movable in height with relation to the outer surface of the grooming tool upon activation of the actuator, further comprising at least one blade plate located on the inner surface of the grooming tool in fixed connection with a base of a blade and in movable connection with a sliding mechanism.

\* \* \* \* \*